G. W. RICHARDSON.
Harvester.
No. 24,848.
Patented July 19, 1859.
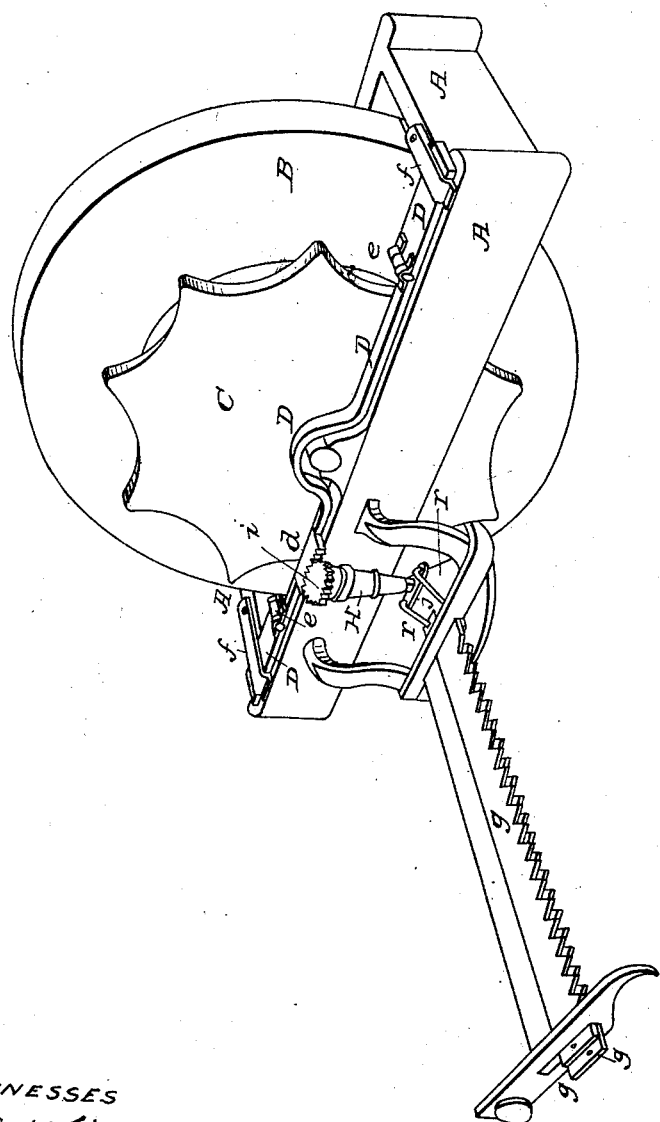
WITNESSES
INVENTOR

UNITED STATES PATENT OFFICE.

GEORGE W. RICHARDSON, OF GRAYVILLE, ILLINOIS, ASSIGNOR TO HIMSELF AND GEORGE M. WEED, OF SAME PLACE.

IMPROVEMENT IN HARVESTING-MACHINES.

Specification forming part of Letters Patent No. 24,848, dated July 19, 1859.

*To all whom it may concern:*

Be it known that I, G. W. RICHARDSON, of Grayville, in the county of White and State of Illinois, have invented a new and useful Improvement in Machinery for Operating Sickles in Harvesters; and I do hereby declare that the following is a full, clear, and exact description thereof, reference being had to the accompanying drawing, and the letters of reference marked thereon, making part of this specification.

My invention relates to certain improvements in mode of operating sickles in harvesters, hereinafter described, by means of which I am enabled to operate both sickles in opposite directions at the same time.

The accompanying drawing represents my invention in perspective, showing the parts for operating the sickles as arranged for use.

A is the frame-work of the machine, B the driving-wheel.

C is a cam-wheel attached to and made to rotate in harmony with the driving-wheel B.

D is a reciprocating sliding bar, provided with a cogged plate, $d$, friction-rollers $e$, secured in its proper position by brackets $f$, and made to operate by means of cam-wheel $c$.

H is a vertical shaft, provided at its upper end with the pinion $i$ and at its lower end with the transverse plate $j$. The pinion $i$ meshes into and is operated by the cogged plate $d$.

$r\ r$ are rods made to connect the ends of the plate $j$ to the sickles $g\ g$, so that as the sliding bar is made to vibrate and impart constant semi-rotation to the shaft H the sickles are made to traverse in opposite directions at the same time by means of the rods $r\ r$.

I do not claim reciprocating movement nor cam-wheel movement to drive harvester-cutters, nor yet two serrated cutters operating reciprocally, nor operating the cutters by lever-arms or rock-shafts, as all these are common devices for such purposes; but What I do claim as my invention, and desire to secure by Letters Patent, is—

The application of the rack $d$ upon the reciprocating bar D D and pinion $i$ upon the vertical shaft H, connected and arranged for operating the two sickles at the same time by the cam-wheel $c$ in manner described.

GEORGE W. RICHARDSON.

Witnesses:
 A. A. WHITE,
 WM. MICHELS.